(12) United States Patent
McCabe (10) Patent No.: US 12,112,459 B2
(45) Date of Patent: Oct. 8, 2024

(54) SYSTEMS AND METHODS FOR REMOVING GRID LINES FROM DIGITAL GRAPH IMAGES

(71) Applicant: THE BOEING COMPANY, Chicago, IL (US)

(72) Inventor: Mark McCabe, Larkspur, CO (US)

(73) Assignee: THE BOEING COMPANY, Chicago, IL (US)

( * ) Notice: Subject to any disclaimer, the term of this patent is extended or adjusted under 35 U.S.C. 154(b) by 110 days.

(21) Appl. No.: 17/878,124

(22) Filed: Aug. 1, 2022

(65) Prior Publication Data
US 2024/0037718 A1 Feb. 1, 2024

(51) Int. Cl.
G06T 5/77 (2024.01)
G06T 5/10 (2006.01)
G06T 5/20 (2006.01)
G06T 11/20 (2006.01)

(52) U.S. Cl.
CPC .......... *G06T 5/77* (2024.01); *G06T 5/10* (2013.01); *G06T 5/20* (2013.01); *G06T 11/206* (2013.01); *G06T 2207/20056* (2013.01)

(58) Field of Classification Search
None
See application file for complete search history.

(56) References Cited

U.S. PATENT DOCUMENTS

| 2002/0196901 A1* | 12/2002 | Inoue | G01T 1/2928 378/154 |
| 2017/0294001 A1* | 10/2017 | Zhang | G06T 5/10 |
| 2020/0380650 A1* | 12/2020 | Hsu | G06T 7/70 |
| 2021/0012465 A1* | 1/2021 | Kim | G06T 5/50 |

* cited by examiner

*Primary Examiner* — Aaron M Richer
(74) *Attorney, Agent, or Firm* — Mary D. Lawlor; The Small Patent Law Group, LLC (57) ABSTRACT

A system and a method include a display and a control unit including one or more processors configured to create a filter, and apply the filter to spectrum graphs of digital images to create modified spectrum graphs of the digital images. The digital images being digital charts including grid lines and data lines. The control unit is configured to convert the modified spectrum graphs to modified digital images. The modified digital images being modified digital charts that include the data lines, and at least some of the grid lines are removed from the digital charts of the digital images.

20 Claims, 9 Drawing Sheets

SYSTEMS AND METHODS FOR REMOVING GRID LINES FROM DIGITAL GRAPH IMAGES

FIELD OF THE DISCLOSURE

Examples of the present disclosure generally relate to systems and methods for removing grid lines from digital graph images.

BACKGROUND OF THE DISCLOSURE

Engineering and scientific computer programs use data from graphical images which depict system characteristics, often as functions of one or two independent variables. The data is presented as curves or lines against gridded backgrounds. The gridded backgrounds enable manual reading of data from the curves.

Converting the characteristic data curves into series of digitized x-y data pairs is often necessary to automate calculations of system characteristics. Currently, automated digitizing methods require that the data curves include intrinsic characteristics that distinguish the data lines from the grid lines of the gridded backgrounds. As one example, the data lines may have red-green-blue (RGB) values (colors) that are different than RGB values of the grid lines. Indeed, in instances where no intrinsic indicators exist between the data lines and grid lines (as one example, where both are shown in gray-scale), automated digitization is unavailable. Alternatively, in instances of using line-following algorithms to automate the digitization of charts, the algorithms can be unreliable as the algorithms can be fooled by the grid lines in locations where the data lines and grid lines are substantially collinear.

SUMMARY OF THE DISCLOSURE

A need exists for a system and a method for efficiently and effectively algorithmically modifying digital graphical images, such as digitizing chart data, to separate grid lines from data lines, such as grid lines that interfere with or are at least partially collinear with the data lines. Further, a need exists for a system and a method that improves efficiency of automatically separating the grid lines from the data lines and graphical text.

With those needs in mind, certain examples of the present disclosure provide a system including a display and a control unit including one or more processors configured to analyze digital graphical images in a frequency domain, and create filters that may be applied to the digital graphical images to remove some grid lines from the digital graphical images and preserve the data lines. In at least one example, the grid lines and the data lines may be illustrated as gray-scale grid and data lines.

In one or more embodiments, the control unit may be an artificial intelligent control unit that may have decision authority and may make intelligent decisions for the generation of modified digital graphical images.

In at least one example, the digital graphical images may be engineering, scientific, financial, and/or other mathematical graphs or other chart data. The digital graphical images may include regular or periodic grid lines, and data lines that may intersect with the grid lines.

In at least one example, personnel observing the digital graphical images may be pilots or flight attendants for an aircraft, operators of other vehicles, such as trains, buses, or the like, medical staff within one or more medical facilities, such as hospitals, financial analysts, laboratory staff, research analysts, or the like.

In at least one example, the control unit is configured to generate spectrum graphs of the digital graphical images, such as to examine the digital graphical images in the frequency domain. The display of the system may illustrate to the personnel the digital graphical images and/or the spectrum graphs of the digital graphical images. In at least one example, the control unit is configured to apply one or more mathematical processes to the digital graphical images to generate spectrum graphs of the digital images.

In at least one example, the control unit is configured to create a filter based on one or more rules and/or adjustable parameters. In at least one example, the system also includes a memory that may be communicatively coupled with the control unit, and may store the rules and/or adjustable parameters by which the control unit is configured to create the filter. Optionally, the control unit may create the filter based on one or more rules and/or adjustable parameters manually input into an input device of the system by an operator of the system.

In at least one example, the control unit is configured to apply the filter to at least one of the spectrum graphs of the digital graphical image to create a filtered spectrum graph of the digital graphical image. In at least one example, the control unit is configured to apply one or more mathematical processes to convert the filtered spectrum graph out of the frequency domain, and to create a modified digital graphical image in which at least some of the grid lines are removed or hidden from view, and the data lines are preserved.

Certain examples of the present disclosure provide a method including generating, by a control unit including one or more processors, spectrum graphs of digital images; creating filters; applying filters, by the control unit, to the spectrum graphs, by the control unit; and performing, by the control unit, mathematical processes to the spectrum graphs, to digitize chart data.

Certain examples of the present disclosure provide a non-transitory computer-readable storage medium comprising executable instructions that, in response to execution, cause one or more processors to generate one or more spectrum graphs of digital images; create filters; and apply the filters to one or more of the spectrum graphs; to digitize chart data.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

In at least one example, systems and method are configured to remove at least some grid lines from digital graphical images while preserving data lines and/or text. The digital graphical images may be gray-scale engineering and/or scientific graphs. Examples of the subject disclosure provide systems and methods that allow for digitization of gray-scale chart data to allow an operator to quickly and efficiently analyze the chart data. For example, the graphical chart data may be shown in gray-scale, and may include grid lines and data lines. At least some of the grid lines, or a portion of the grid lines may be substantially collinear with a portion of the data lines. Distinguishing the grid lines from the data lines by the operator, such as without magnification of the chart data, may be inefficient and time consuming. The systems and methods of the subject disclosure effectively allow for the removal of at least some of the grid lines from the chart data, and to effectively separate the at least some grid lines from the chart data. For example, separating the grid lines from the chart data, or hiding at least some of the grid lines, allows the operator to more quickly and efficiently analyze the chart data relative to the operator analyzing chart data that includes grid lines interfering with or extending substantially collinearly with data lines.

Figure 1:
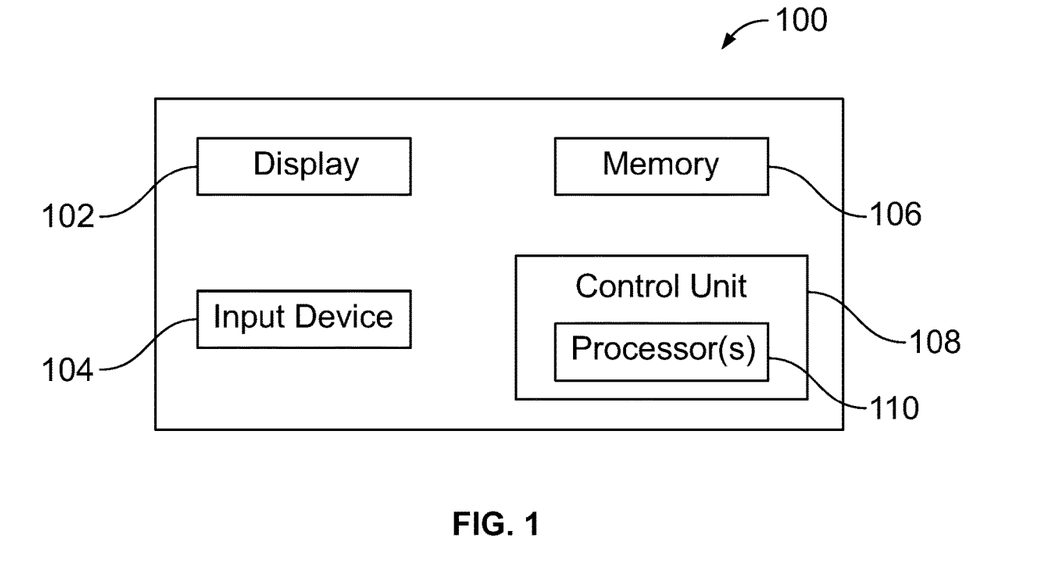
FIG. 1 illustrates a schematic block diagram of a system for filtering graphical digital images, according to an example of the present disclosure.

FIG. 1 illustrates a schematic block diagram of a system 100 for filtering graphical digital images, according to an example of the present disclosure. Examples of the graphical images including engineering, scientific, financial, and/or other mathematical graphs or other chart data. The graphs may include grid lines and data lines that are overlaying the grid lines, and one or more of the grid lines or data lines may be shown or illustrated as gray-scale data. As one example, the graph may include plural pixels of data, and each pixel may include data lines and/or grid lines extending through the plural pixels. The grid lines and data lines may both be illustrated as black lines, and in one or more of the plural pixels, the data lines may be substantially collinear with the grid lines. For example, the gray-scale data lines that are substantially collinear with the gray-scale grid lines within one or more of the pixels may be indistinguishable from the gray-scale grid lines, such as to the naked or unassisted eye of personnel reviewing the graphical digital image. For example, personnel observing the graphical digital image without the aid of a microscopic device may be unable to differentiate the data lines from the grid lines at one or more locations within the digital image.

In one or more examples, the personnel observing the digital image may be pilots or flight attendants for an aircraft. As another example, the personnel may be operators of vehicles, such as trains, buses, or the like. As another example, the personnel can be medical staff within one or more medical facilities, such as hospitals. As another example, the personnel can be financial analysts, laboratory staff, research analysts, or the like.

The system includes a control unit 108 in communication with a display 102 and an input device 104, such as through one or more wired or wireless connections. The display may be an electronic monitor or screen, a touchscreen, a television, or the like. The input device may be or include a keyboard, mouse, stylus, touchscreen interface, and/or the like. In at least one example, the display and input device are part of a computer workstation, such as can include the control unit 108. As another example, the system including the display and/or input device can be a handheld device, such as a smart phone, smart tablet, another portable system, or the like.

The system includes a memory 106 that may represent data storage and/or elements, that may store instructions, data, or other information as desired or needed. The memory may be in the form of an information source or a physical memory element within a processing machine.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

In one or more examples, the control unit may be an artificial intelligent control unit. Beyond simple command and control, the artificial intelligent control unit in various embodiments assumes responsibility for certain tasks that require decision making. For example, the artificial intelligent control unit 108 may use information from the memory, from sensors (not shown), along with historic patterns, or the like, to make decisions regarding one or more states and/or actions related to the system.

The artificial intelligent control unit 108 includes one or more processors 110 that may perform operations of the system. In operation, the processors may receive information, such as from personnel operating the system via the input device, data stored within the memory, data from another external source (e.g., from sensors, other processing systems, or the like, communicatively coupled with the system via wired and/or wireless communication pathways, etc.), or the like. The processors may generate digital images, such as digital graphical images, that may be displayed to an operator of the system. Optionally, the processors may change or adjust the digital images based on feedback received from the operator of the system, such as feedback manually received via the input device. Optionally, the processors may change or adjust the digital images based on new data, additional data, alternative data, or the like, received from the memory, from one or more sensors (not shown) operably coupled with the system, from another processing system (not shown), or the like. In one or more embodiments, the digital images may be graphical images, such as data graphs that include data lines and/or curves that may displayed relative to grid lines. The data lines and/or curves may be shown or illustrated as gray-scale data lines or curves. Additionally or alternatively, the grid lines may be shown as gray-scale data lines or curves. Optionally, one of the data lines or grid lines may be shown as having one or more RGB values (e.g., may be shown as colors)

As used herein, the term "control unit," "controller," "central processing unit," "CPU," "computer," or the like, may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 108 may be or include one or more processors that are configured to control operation, as described herein.

The diagrams of examples herein may illustrate one or more control or processing units, such as the control unit 108. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 108 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

Figure 2:
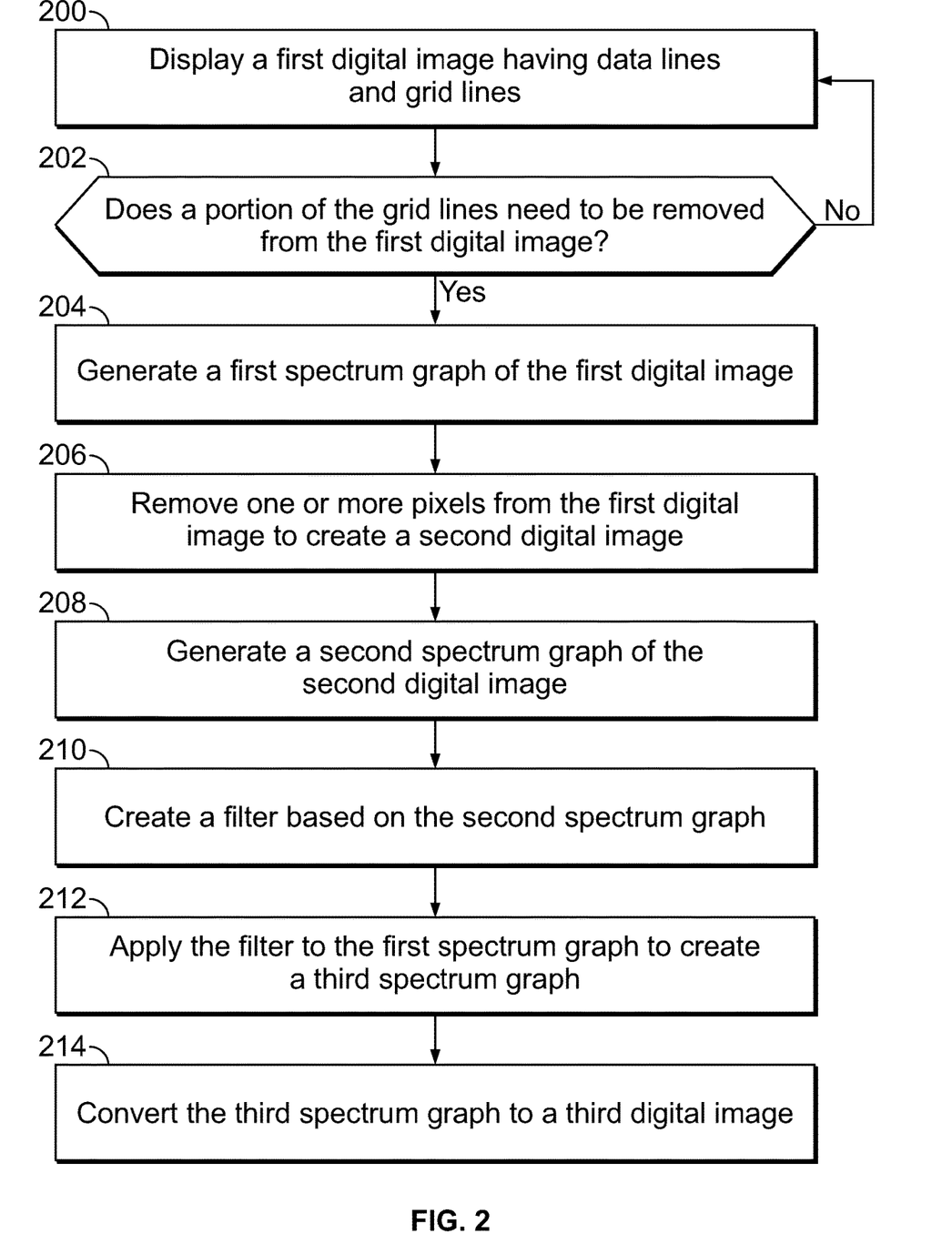
FIG. 2 illustrates a flow chart of a method for filtering digital images, according to an example of the present disclosure.
Figure 3:
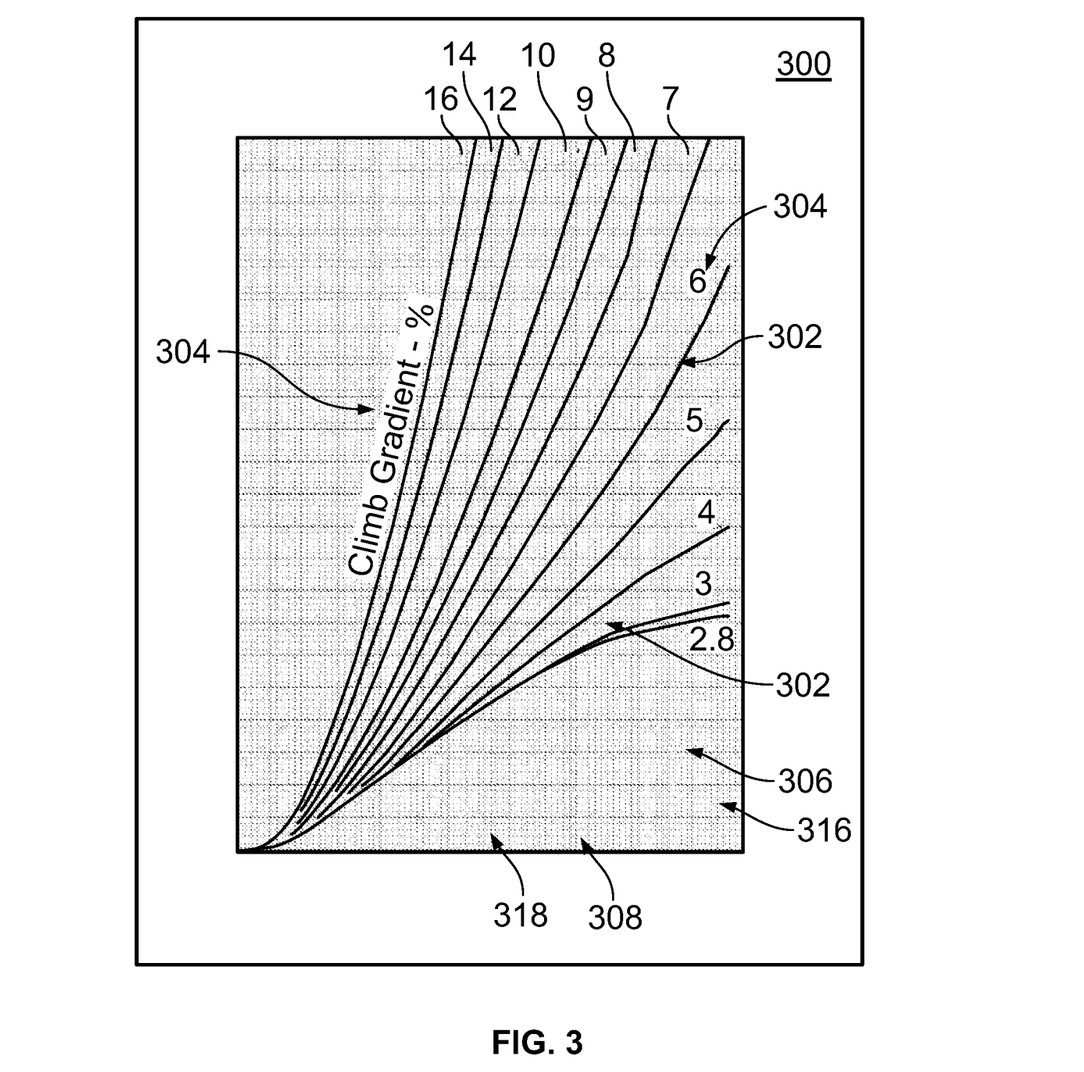
FIG. 3 illustrates a first digital image, according to an example of the present disclosure.

FIG. 2 illustrates a flow chart of a method for filtering digital images, according to an example of the present disclosure. At 200, a first digital image is displayed, such as via the display 102 of the system shown in FIG. 1. FIG. 3 illustrates a first digital image 300, according to an example of the present disclosure. In the illustrated embodiment, the first digital image is a gray-scale graph that includes gray-scale data lines plotted against gray-scale grid lines. The first digital image includes plural data lines 302 and text 304 that are plotted against plural grid lines 306, 308, 316, 318. The grid lines may be separately identified as major horizontal grid lines 306, minor horizontal grid lines 316 disposed between the major horizontal grid lines, major vertical grid lines 308, and minor vertical grid lines 318 disposed between the major vertical grid lines. For example, the major grid lines may be arranged in a pattern and separated from each other by a first patterned value, and the minor grid lines may be arranged in a pattern, disposed between the major grid lines, and separated from each other by a second patterned value. The major and minor grid lines are regularly spaced apart, and are periodic, relative to the data lines.

Returning to FIG. 2, at 202, a determination is made if a portion of the grid lines needs to be removed from the first digital image. As one example, a portion of the grid lines may need to be removed if the grid lines are substantially collinear with the data lines, such that the grid lines are indistinguishable from the data lines to personnel reviewing the first digital image. For example, at one or more locations within the first digital image, personnel observing the first digital image may be unable to distinguish the grid lines from the data lines. As another example, personnel may be able to distinguish the grid lines from the data lines, but only with the use of magnification of the first digital image. As another example, personnel may be unable to substantially instantaneously distinguish the grid lines from the data lines (e.g., at first observation of the digital image), but may be able to distinguish the grid lines from the data lines after observation of the digital image from a length of time (e.g., one minute, 5 minutes, or the like). In order to substantially instantaneously distinguish the grid lines from the data lines, or within a predetermined length of time, or without magnification of the digital image, a portion of the grid lines may need to be removed from the digital image, and flow of the method may proceed toward step 204. As another example, the artificial intelligent control unit may automatically determine that at least some of the grid lines are to be removed, such as based on historical information or historical data, for example, relating to the historical digitization of similar or related graphs. Alternatively, if personnel is able to substantially instantaneously distinguish the grid lines from the data lines at the moment of observing the digital image, flow of the method may return to 200.

Figure 4:
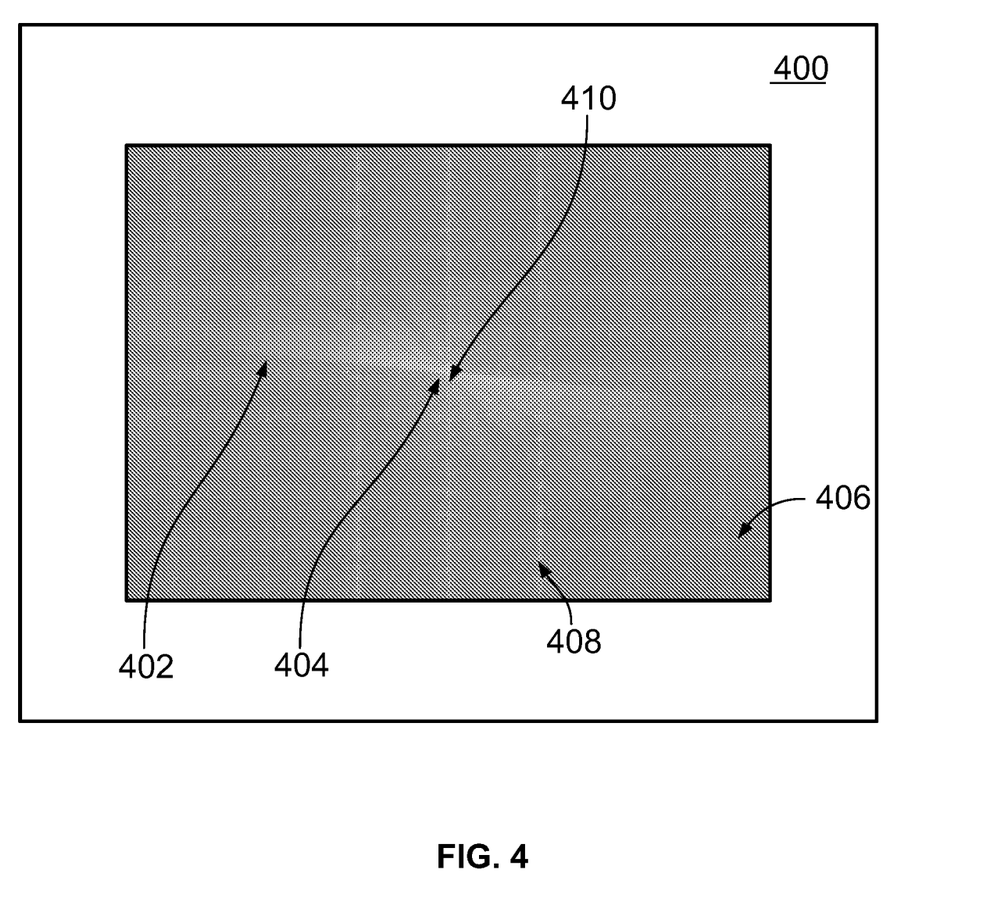
FIG. 4 illustrates a first spectrum graph of a Fourier transform of the first digital image shown in FIG. 3, according to an example of the present disclosure.

In one or more examples, at least some of the grid lines can be separated from the data lines by analyzing the first digital image in the frequency domain. For example, at 204, the one or more processors may generate a first spectrum graph of the first digital image. FIG. 4 illustrates a first spectrum graph 400 of the first digital image shown in FIG. 3, according to an example of the present disclosure. As one example, the first spectrum graph may be generated by one or more known mathematical methods or processes. For example, a Fourier Transform calculation may be used to generate the first spectrum graph from the first digital image. The Fourier transform calculation may be a two-dimensional discrete Fourier transform calculation, a discrete-time Fourier transform calculation, or the like.

The first spectrum graph includes plural pixels of data, with each pixels including corresponding characteristics associated with power levels, frequencies, phase angles, or the like. For example, each pixel in the first spectrum graph represents the power in the original image at the frequency and phase angle of the corresponding pixel. The lighter or brighter pixels may represent the pixels having a greater power relative to the darker or less bright pixels. Additionally, pixels disposed farther away from a general center 410 of the spectrum (e.g., a first section of pixels 402) can represent higher frequency pixels relative to a second section of pixels 404 disposed closer to the general center of the first spectrum graph. For example, the pixels associated with the second section of pixels 404 can represent average and/or lower frequency pixels relative to the pixels associated with the first section of pixels 402.

The first spectrum graph also includes horizontal and vertical bands 406, 408, respectively. In one or more embodiments, the horizontal and vertical bands can suggest that the power of the grid lines of the first digital image may be concentrated at those frequencies and phases.

Figure 5:
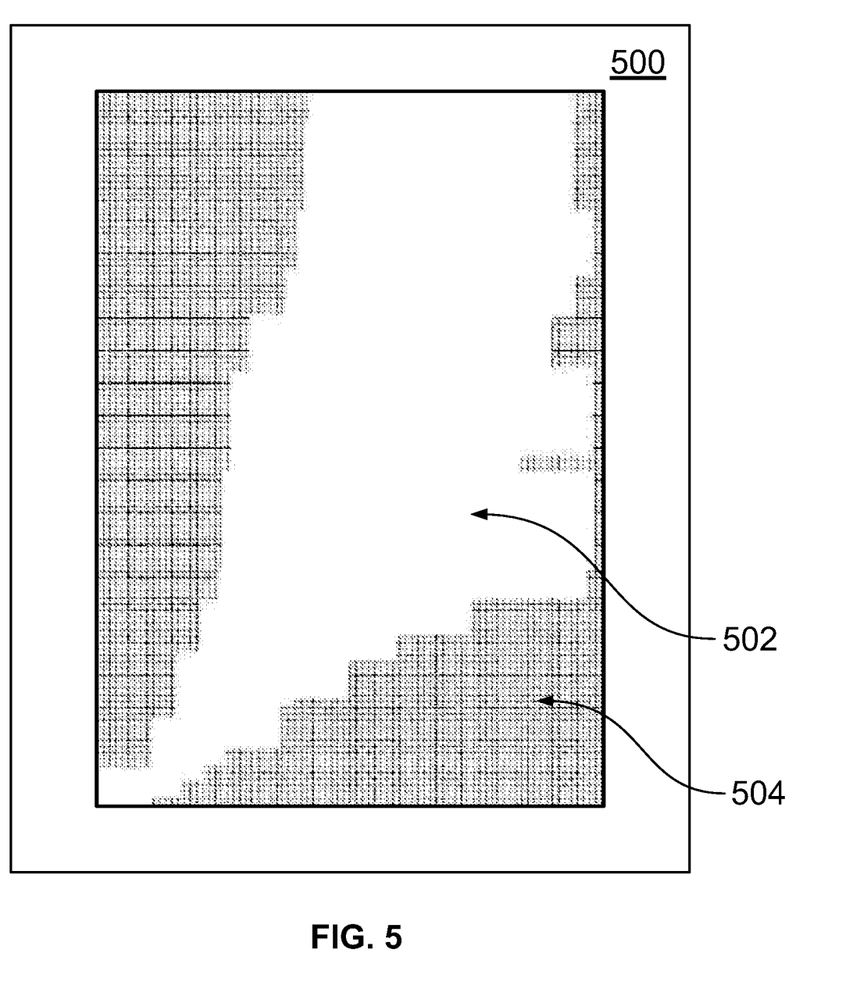
FIG. 5 illustrates a second digital image, according to an example of the present disclosure.

Returning to FIG. 2, at 206, one or more of plural pixels of the first digital image are removed from the first digital image to create a second digital image. For example, FIG. 5 illustrates a second digital image 500, according to an example of the present disclosure. The second digital image is representative of the first digital image, with a first portion of pixels 502 that have been removed from the first digital image, and with a second portion of pixels 504 that have not been removed from the first digital image. In the illustrated embodiment, the first portion of the pixels 502 that have been removed from the first digital image include the data lines and at least some grid lines, such as the grid lines that overlap with or intersect with the data lines. For example, the pixels removed from the first digital image to create the second digital image are associated with the data lines, and the grid lines extending within the removed pixels may by default also be removed from the first digital image.

As one example, the removed pixels may be manually removed from the first digital image to create the second digital image, such as by personnel reviewing the first digital image. For example, a person reviewing the first digital image may manually identify to the one or more processors which pixels are to be removed and/or which pixels are not to be removed from the first digital image. As another example, the one or more processors of the artificial intelligent control unit may automatically identify and indicate to the person which pixels are to be removed and which pixels are to remain. As another example, the one or more processors of the artificial intelligent control unit may automatically identify which pixels are to be removed and which pixels are to remain, and may automatically remove the pixels that are identified as to be removed. In one or more embodiments, the processors may receive or obtain rules, instructions, or the like that may be stored in the memory 106 of the system. The rules and/or instructions may be based on historical information, historically preferred or desired modifications of digital images, or the like. The rules may indicate to the processors which pixels are to be removed and which pixels are to remain, and can allow the processors to automatically remove the one or more pixels from the first digital image (e.g., without manual operator input).

In one or more examples, the number of pixels that may be removed from the first digital image may be based on a number of pixels of the first digital image that include at least some data lines and/or an amount of the data lines that are to be removed from the first digital image. For example, a predetermined portion of the data lines may need to be removed from the first digital image. In one embodiment, all of the data lines may need to be removed. In another embodiment, about 75% of the data lines may be removed. In another embodiment, about 50% of the data lines may be removed.

Figure 6:
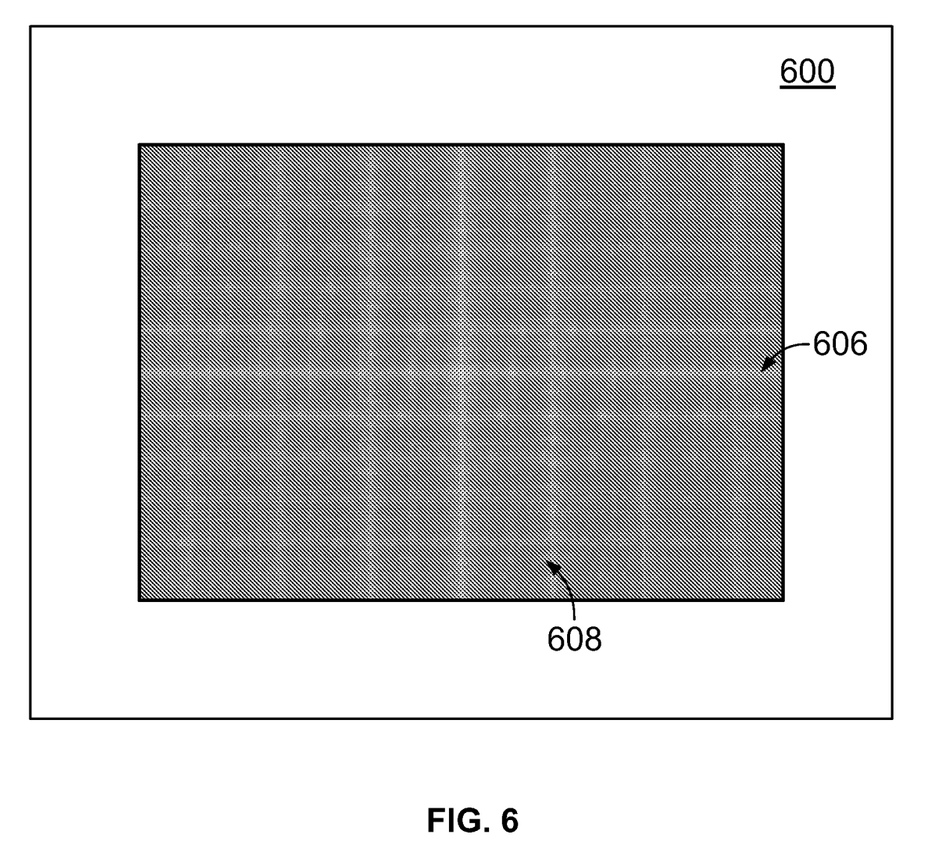
FIG. 6 illustrates a second spectrum graph of a Fourier transform of the second digital image shown in FIG. 5, according to an example of the present disclosure.

Returning to FIG. 2, at 208, a second spectrum graph of the second digital image is generated, such as by the one or more processors. FIG. 6 illustrates a second spectrum graph 600 of a Fourier transform of the second digital image 500 shown in FIG. 5, according to an example of the present disclosure. Like the first spectrum graph, the one or more processors of the system may generate the second spectrum graph using one or more known mathematical methods or processes. For example, a Fourier Transform calculation may be used to generate the second spectrum graph from the second digital image. The Fourier transform calculation may be a two-dimensional discrete Fourier transform calculation, a discrete-time Fourier transform calculation, or the like.

Removed from the second spectrum graph, as compared with the first spectrum graph, are the higher and lower frequency pixels 402, 404, respectively, indicative of the pixel characteristics associated with the data lines (removed from the second digital image). Like the first spectrum graph, the second spectrum graph includes horizontal and vertical bands 606, 608 that indicate that the power of the grid lines of the second digital image may be concentrated at those frequencies and phases. For example, the second spectrum graph 600 confirms that the power of the grid image is located at phases and frequencies represented by the horizontal and vertical bands 406, 408, shown in FIG. 4.

At 210, a filter is created based on the second spectrum graph. For example, the second spectrum graph may be used to build a filter. As one example, the processors 110 of the system may obtain rules or parameters that may be used to generate the filter from the memory 106. The rules and/or parameters may be adjusted (manually by a user of the system and/or automatically by the processors) to provide a digital image that includes the data lines but removes and/or hides at least some of the grid lines. As another example, the processors may be associated with a graph analysis tool that may create the filter.

Figure 7:
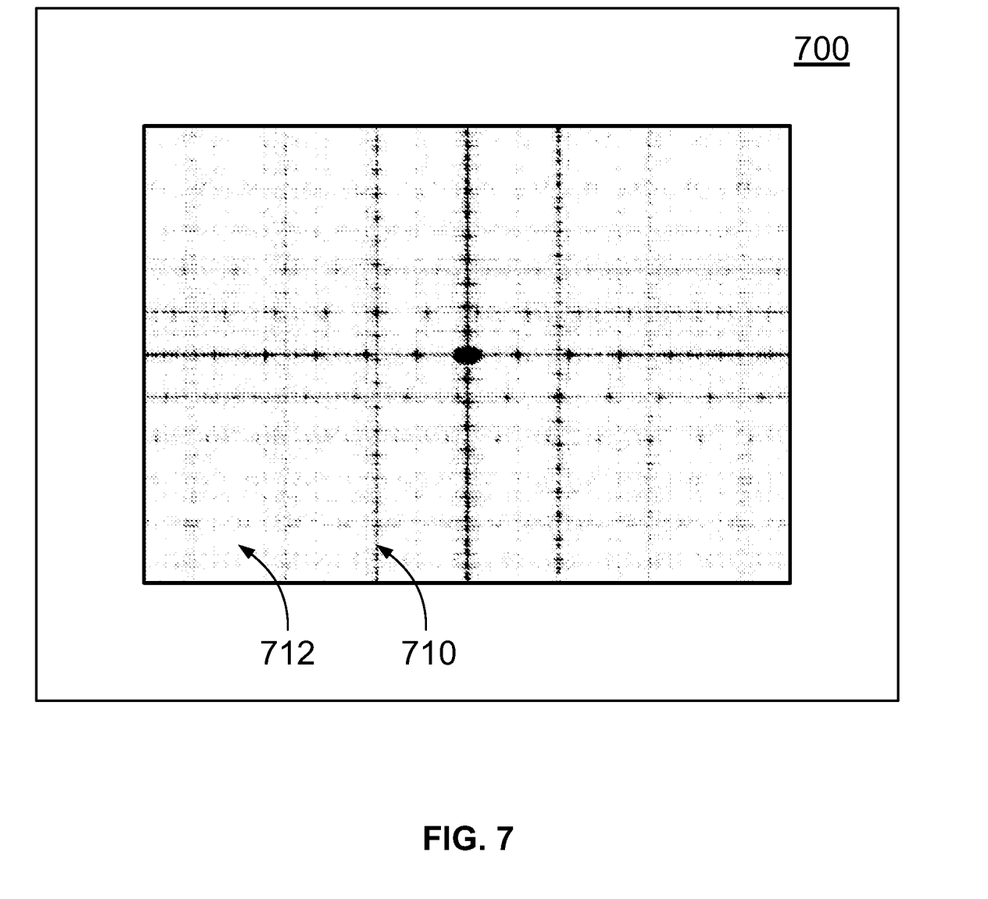
FIG. 7 illustrates a filter, according to an example of the present disclosure.

The filter parameters that may be adjusted may include, but may not be limited to, the filter type (e.g., Butterworth, Gaussian, Laplacian, or the like), a filter width (e.g., a number of pixels associated with the width of the moving filter, such as one pixel, about 5 pixels, or the like), minimum and/or maximum filter values (e.g., values associated with the output filter, such as a minimum of about zero, a maximum of about one, or the like), or the like.

FIG. 7 illustrates a filter 700, according to an example of the present disclosure. The filter 700 is created by the processors of the system based on the rules or filter parameters. In one embodiment, the filter may be created based on the characteristics of the plural pixels of the second spectrum graph. For example, the processors may identify two or more different subsets of the plural pixels. A first subset of the plural pixels of the second spectrum graph may have a first set of characteristics (e.g., a first group or range of frequencies, a first group or range of phase angles, or the like), and a second set of the plural pixels of the second spectrum graph may have a second set of characteristics (e.g., a second group or range of frequencies, a second group or range of phase angles, of the like).

The first and second subset of characteristics may be based on determined characteristic threshold values. Characteristics that exceed the determined threshold values, may be assigned or identified as a first classification, and characteristics that are less than the determined threshold values may be assigned or identified as a second classification. In the illustrated embodiment of FIG. 7, at frequencies and phases where the pixels of the second spectrum graph exceeded a target determined threshold value, the pixels may be identified as the first classification, and the filter value for the one or more pixels of the first subset having the first classification identification may be set to zero and shown as black (e.g., pixels 710). Alternatively, at frequencies and phases where the pixels of the second spectrum graph do not exceed the target determined threshold value, the pixels of the second subset may be identified as the second classification, and the filter value for the one or more pixels having the second classification identification may be set to one and shown as white (e.g., pixels 712). Optionally, the filter may be created based on alternative algorithms, rules, subset classifications, or the like.

Returning to FIG. 2, at 212, the filter is applied to the first spectrum graph (e.g., of the first digital image) to create a third spectrum graph. As one example, the first spectrum graph may be multiplied element-by-element by the one or more processors by the filter. Optionally, other mathematical processors may be used to apply the filter to the first spectrum graph.

Figure 8:
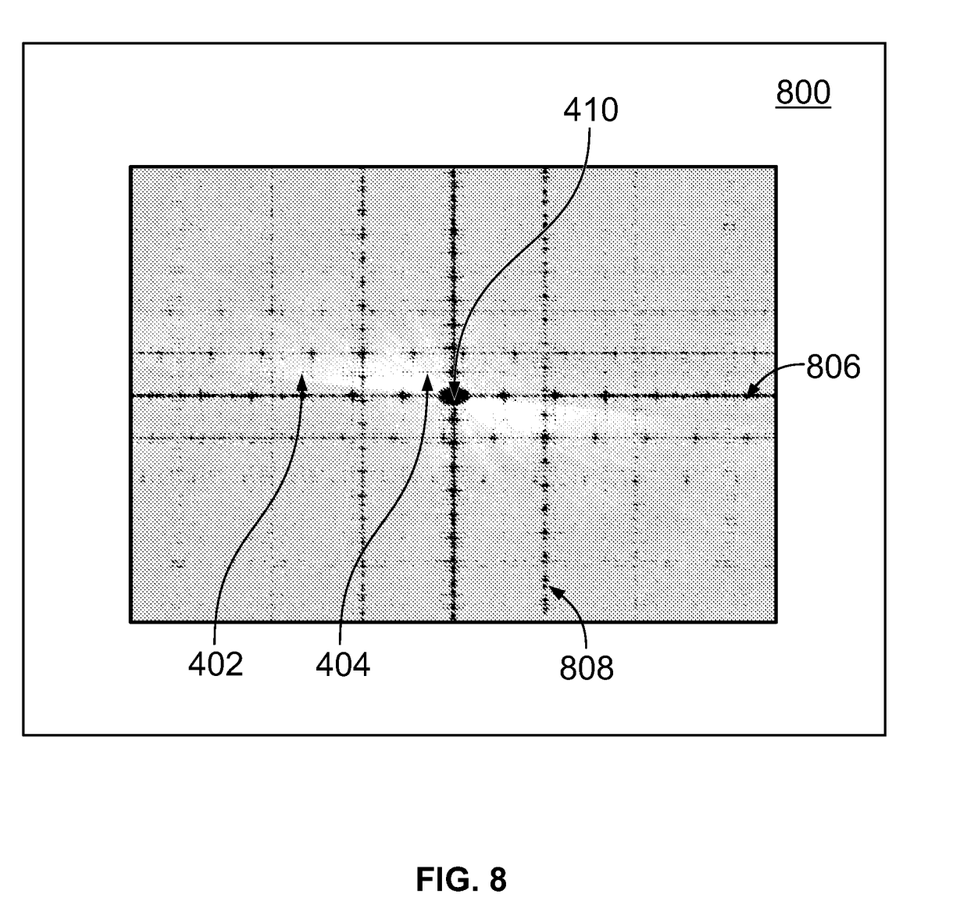
FIG. 8 illustrates a third spectrum graph representative of the filter shown in FIG. 7 being applied to the first spectrum graph shown in FIG. 4, according to an example of the present disclosure.

FIG. 8 illustrates a third spectrum graph 800 representative of the filter shown in FIG. 7 being applied to the first spectrum graph shown in FIG. 4, according to an example of the present disclosure. Like the first spectrum graph 400 shown in FIG. 4, the third spectrum graph 800 includes the first section of pixels 402 that represent higher frequency pixels and are disposed a distance away from the general center 410 of the graph. Additionally, the second section of pixels 404 that represent lower frequency pixels and are disposed closer to the general center 410 of the graph relative to the first section of pixels 402.

The third spectrum graph also includes horizontal and vertical bands 806, 808, respectively. The horizontal and vertical bands 806, 808 shown in FIG. 8 differ from the horizontal and vertical bands 406, 408 shown in FIG. 4. For example, responsive to the first spectrum graph being multiplied by the filter, the horizontal and vertical bands shown in FIG. 8 are illustrated as black or dark lines. Alternatively, the horizontal and vertical bands shown in FIG. 4 are shown are white or light lines.

Figure 9:
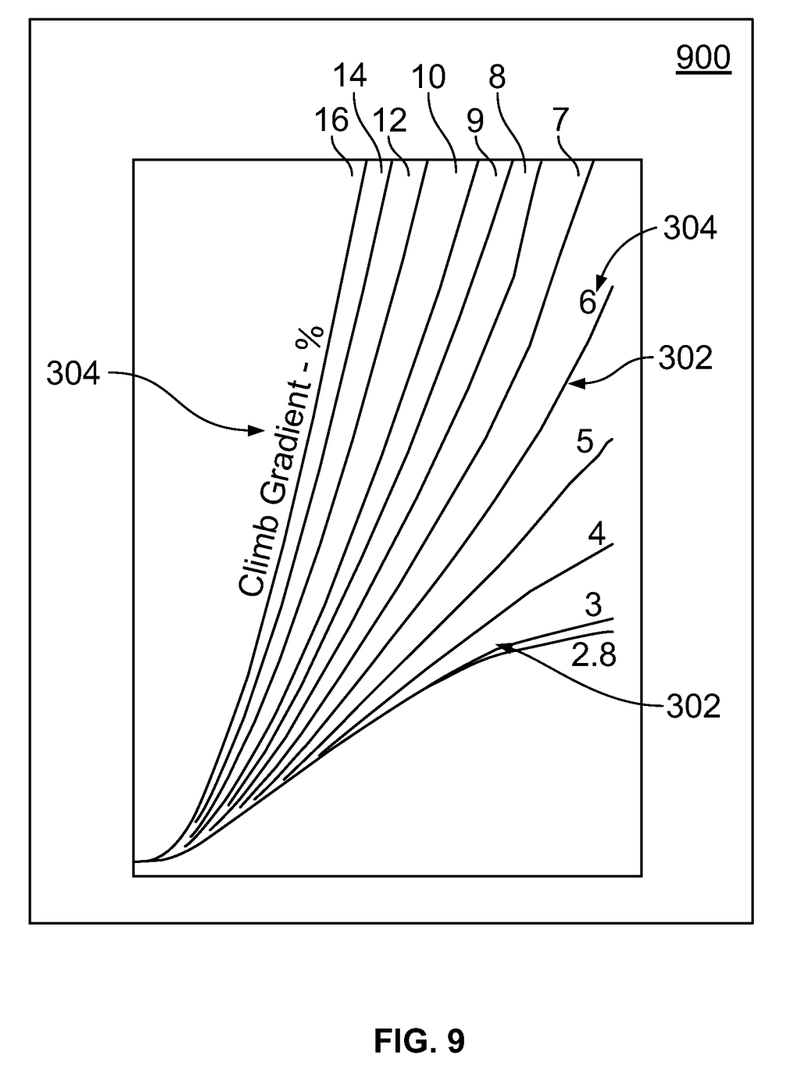
FIG. 9 illustrates a third digital image, according to an example of the present disclosure.

Returning to FIG. 2, at 214, the third spectrum graph is converted to a third digital image. FIG. 9 illustrates a third digital image 900, according to an example of the present disclosure. As one example, the third spectrum graph may be converted to the third digital image by the processors performing an inverse Fourier transform on the third spectrum graph shown in FIG. 8. Optionally, other mathematical processes may be relied upon to convert the third spectrum graph to the third digital image.

In the illustrated embodiment of FIG. 9, the third digital image includes the data lines 302 and text 304 included in the first digital image 300 illustrated in FIG. 3. Additionally, at least a portion of the grid lines of the first digital images are removed from the third digital image. For example, applying the filter to the first spectrum graph eliminates or removes at least a portion of the grid lines, while the data lines and the text remain substantially preserved.

Further, the disclosure comprises examples according to the following clauses:

Clause 1. A method comprising:
generating, by a control unit, a first spectrum graph of a Fourier transform of a first digital image, the first digital image including plural pixels comprising one or more of data lines or grid lines;
removing, by the control unit, one or more of the plural pixels from the first digital image to create a second digital image, the one or more pixels removed from the first digital image including at least some of the data lines and at least some grid lines;
generating, by the control unit, a second spectrum graph of a Fourier transform of the second digital image;
creating, by the control unit, a filter based on the second spectrum graph of the Fourier transform of the second digital image, the second spectrum graph including plural pixels of data having different characteristics, the filter identifying at least first and second subsets of the plural pixels, wherein the data of the plural pixels of the first subset has a first set of characteristics, and the data of the plural pixels of the second subset having a second set of characteristics, the filter identifying the first subset of the plural pixels as a first classification, and the filter identifying the second subset of the plural pixels as a second classification;
applying, by the control unit, the filter to the first spectrum graph of the Fourier transform of the first digital image to create a third spectrum graph; and
performing, by the control unit an inverse Fourier transform on the third spectrum graph to convert the third spectrum graph to a third digital image, the third digital image including the data lines of the first digital image, wherein at least some of the grid lines of the first digital image are removed from the third digital image.

Clause 2. The method of Clause 1, further comprising automatically removing the one or more pixels from the first digital image to create the second digital image.

Clause 3. The method of Clauses 1-2, further comprising manually removing the one or more pixels from the first digital image to create the second digital image.

Clause 4. The method of Clauses 1-3, wherein the first digital image is a gray-scale digital graph image.

Clause 5. The method of Clauses 1-4, wherein the different characteristics of the plural pixels of data of the second spectrum graph include one or more of different frequencies or different phase angles.

Clause 6. The method of Clauses 1-5, wherein the different characteristics of the plural pixels of data of the second spectrum graph include different frequencies, wherein the data of the plural pixels of the first subset have frequencies less than a determined threshold value, and the data of the plural pixels of the second subset have frequencies greater than the determined threshold value.

Clause 7. The method of Clauses 1-6, further comprising creating the filter based on one or more of frequencies or phase angles of the data of the plural pixels of the second spectrum graph.

Clause 8. The method of Clauses 1-7, further comprising removing the one or more of the plural pixels from the first digital image to remove a predetermined portion of the data lines from the first digital image.

Clause 9. A system comprising:
a display configured to illustrate a first digital image; and
a control unit including one or more processors configured to generate a first spectrum graph of a Fourier transform of the first digital image, the first spectrum graph including plural pixels comprising one or more of data lines or grid lines, wherein one or more of the plural pixels are configured to be removed from the first digital image to create a second digital image, the one or more of the plural pixels removed from the first digital image including at least some of the data lines and at least some grid lines,
the control unit configured to generate a second spectrum graph of a Fourier transform of the second digital image, and create a filter based on the second spectrum graph of the Fourier transform of the second digital image, the second spectrum graph including plural pixels of data having different characteristics, the filter identifying at least first and second subsets of the plural pixels, wherein the data of the plural pixels of the first subset has a first set of characteristics, and the data of the plural pixels of the second subset having a second set of characteristics, the filter identifying the first subset of the plural pixels as a first classification, and the filter identifying the second subset of the plural pixels as a second classification,
the control unit configured to apply the filter to the first spectrum graph of the Fourier transform of the first digital image to create a third spectrum graph, and
the control unit configured to perform an inverse Fourier transform on the third spectrum graph to convert the third spectrum graph to a third digital image, the third digital image including the data lines of the first digital image, wherein at least some of the grid lines of the first digital image are removed from the third digital image.

Clause 10. The system of Clause 9, wherein the control unit is configured to automatically remove the one or more of the plural pixels from the first digital image to create the second digital image.

Clause 11. The system of Clauses 9-10, wherein the one or more of the plural pixels removed from the first digital image are configured to be manually removed by an operator of the system to create the second digital image.

Clause 12. The system of Clauses 9-11, wherein the first digital image is a gray-scale digital graph image.

Clause 13. The system of Clauses 9-12, wherein the different characteristics of the plural pixels of data of the second spectrum graph include one or more of different frequencies or different phase angles.

Clause 14. The system of Clauses 9-13, wherein the different characteristics of the plural pixels of data of the second spectrum graph include different frequencies, wherein the data of the plural pixels of the first subset have frequencies less than a determined threshold value, and the data of the plural pixels of the second subset have frequencies greater than the determined threshold value.

Clause 15. The system of Clauses 9-14, wherein the control unit is configured to create the filter one or more of frequencies or phase angles of the data of the plural pixels of the second spectrum graph.

Clause 16. The system of Clauses 9-15, wherein the one or more of the plural pixels removed from the first digital image include a predetermined portion of the data lines.

Clause 17. A non-transitory computer-readable storage medium comprising executable instructions that, in response to execution, cause one or more processors to perform the operations comprising:
  generating a first spectrum graph of a Fourier transform of a first digital image, the first digital image including plural pixels comprising one or more of data lines or grid lines;
  removing one or more of the plural pixels from the first digital image to create a second digital image, the one or more pixels removed from the first digital image including at least some of the data lines and at least some grid lines;
  generating a second spectrum graph of a Fourier transform of the second digital image;
  creating a filter based on the second spectrum graph of the Fourier transform of the second digital image, the second spectrum graph including plural pixels of data having different characteristics, the filter identifying at least first and second subsets of the plural pixels, wherein the data of the plural pixels of the first subset has a first set of characteristics, and the data of the plural pixels of the second subset having a second set of characteristics, the filter identifying the first subset of the plural pixels as a first classification, and the filter identifying the second subset of the plural pixels as a second classification;
  applying the filter to the first spectrum graph of the Fourier transform of the first digital image to create a third spectrum graph; and
  performing an inverse Fourier transform on the third spectrum graph to convert the third spectrum graph to a third digital image, the third digital image including the data lines of the first digital image, wherein at least some of the grid lines of the first digital image are removed from the third digital image.

Clause 18. The non-transitory computer-readable storage medium of Clause 17, wherein said creating the filter comprises determining frequencies of the data, wherein the data of the plural pixels of the first subset have frequencies less than a determined threshold value, and the data of the plural pixels of the second subset have frequencies greater than the determined threshold value.

Clause 19. The non-transitory computer-readable storage medium of Clauses 17-18, wherein said removing the one or more of the plural pixels from the first digital image to create a second digital image comprises removing a predetermined portion of the data lines from the first digital image.

Clause 20. The non-transitory computer-readable storage medium of Clauses 17-18, wherein said applying the filter to the first spectrum graph comprises multiplying each element of the first spectrum graph by the corresponding element of the filter to create the third spectrum graph.

As described herein, examples of the present disclosure provide systems and methods for efficiently and effectively scheduling resources, such as for trips (for example, flights, train or bus journeys, and/or the like). Further, examples of the present disclosure provide systems and methods that improve efficiency of business rules engine methods for determining schedules.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method comprising:
   generating, with a control unit, a first spectrum graph of a Fourier transform of a first digital image, the first digital image including plural pixels comprising of data lines and grid lines;
   identifying one or more of the plural pixels of the first digital image to be removed from the first digital image, wherein the one or more of the plural pixels identified to be removed include a predetermined portion of the data lines of the first digital image and at least some grid lines of the first digital image;
   removing, by the control unit, the identified one or more of the plural pixels from the first digital image to create a second digital image;
   generating, by the control unit, a second spectrum graph of a Fourier transform of the second digital image;
   creating, by the control unit, a filter based on the second spectrum graph of the Fourier transform of the second digital image, the second spectrum graph including plural pixels of data having different characteristics, the filter identifying at least first and second subsets of the plural pixels, wherein the data of the plural pixels of the first subset has a first set of characteristics, and the data of the plural pixels of the second subset having a second set of characteristics, the filter identifying the first subset of the plural pixels as a first classification, and the filter identifying the second subset of the plural pixels as a second classification;
   applying, by the control unit, the filter to the first spectrum graph of the Fourier transform of the first digital image to create a third spectrum graph; and
   performing, by the control unit an inverse Fourier transform on the third spectrum graph to convert the third spectrum graph to a third digital image, the third digital image including the data lines of the first digital image, wherein at least some of the grid lines of the first digital image are removed from the third digital image.

2. The method of claim 1, further comprising automatically removing the one or more pixels from the first digital image to create the second digital image.

3. The method of claim 1, further comprising manually removing the one or more pixels from the first digital image to create the second digital image.

4. The method of claim 1, wherein the first digital image is a gray-scale digital graph image comprising the data lines and text plotted against the grid lines.

5. The method of claim 1, wherein the different characteristics of the plural pixels of data of the second spectrum graph include one or more of different frequencies or different phase angles.

6. The method of claim 1, wherein the different characteristics of the plural pixels of data of the second spectrum graph include different frequencies, wherein the data of the plural pixels of the first subset have frequencies less than a determined threshold value, and the data of the plural pixels of the second subset have frequencies greater than the determined threshold value.

7. The method of claim 1, further comprising creating the filter based on one or more of frequencies or phase angles of the data of the plural pixels of the second spectrum graph.

8. The method of claim 1, further comprising removing the one or more of the plural pixels from the first digital image to remove a predetermined portion of the data lines from the first digital image.

9. A system comprising:
   a display configured to illustrate a first digital image, the first digital image including plural pixels comprising data lines plotted against grid lines; and
   a control unit including one or more processors configured to generate a first spectrum graph of a Fourier transform of the first digital image, the control unit configured to create a second digital image by removing one or more of the plural pixels from the first digital image, the one or more of the plural pixels removed from the first digital image including at least some of the data lines and at least some grid lines,
   the control unit configured to generate a second spectrum graph of a Fourier transform of the second digital image, and create a filter based on the second spectrum graph of the Fourier transform of the second digital image, the second spectrum graph including plural pixels of data having different characteristics, the filter identifying at least first and second subsets of the plural pixels, wherein the data of the plural pixels of the first subset has a first set of characteristics, and the data of the plural pixels of the second subset having a second set of characteristics, the filter identifying the first subset of the plural pixels as a first classification, and the filter identifying the second subset of the plural pixels as a second classification,
   the control unit configured to apply the filter to the first spectrum graph of the Fourier transform of the first digital image to create a third spectrum graph, and
   the control unit configured to perform an inverse Fourier transform on the third spectrum graph to convert the third spectrum graph to a third digital image, the third digital image including the data lines of the first digital image, wherein at least some of the grid lines of the first digital image are removed from the third digital image.

10. The system of claim 9, wherein the control unit is configured to automatically remove the one or more of the plural pixels from the first digital image to create the second digital image.

11. The system of claim 9, wherein the one or more of the plural pixels removed from the first digital image are configured to be manually removed by an operator of the system to create the second digital image.

12. The system of claim 9, wherein the first digital image is a gray-scale digital graph image comprising the data lines and text plotted against the grid lines.

13. The system of claim 9, wherein the different characteristics of the plural pixels of data of the second spectrum graph include one or more of different frequencies or different phase angles.

14. The system of claim 9, wherein the different characteristics of the plural pixels of data of the second spectrum graph include different frequencies, wherein the data of the plural pixels of the first subset have frequencies less than a determined threshold value, and the data of the plural pixels of the second subset have frequencies greater than the determined threshold value.

15. The system of claim 9, wherein the control unit is configured to create the filter based on one or more of frequencies or phase angles of the data of the plural pixels of the second spectrum graph.

16. The system of claim 9, wherein the one or more of the plural pixels removed from the first digital image include a predetermined portion of the data lines.

17. A non-transitory computer-readable storage medium comprising executable instructions that, in response to execution, cause one or more processors to perform the operations comprising:

generating a first spectrum graph of a Fourier transform of a first digital image, the first digital image including plural pixels comprising data lines plotted against grid lines;

removing one or more of the plural pixels from the first digital image to create a second digital image, the one or more pixels removed from the first digital image including at least some of the data lines and at least some of the grid lines extending within the removed pixels;

generating a second spectrum graph of a Fourier transform of the second digital image;

creating a filter based on the second spectrum graph of the Fourier transform of the second digital image, the second spectrum graph including plural pixels of data having different characteristics, the filter identifying at least first and second subsets of the plural pixels, wherein the data of the plural pixels of the first subset has a first set of characteristics, and the data of the plural pixels of the second subset having a second set of characteristics, the filter identifying the first subset of the plural pixels as a first classification, and the filter identifying the second subset of the plural pixels as a second classification;

applying the filter to the first spectrum graph of the Fourier transform of the first digital image to create a third spectrum graph; and performing an inverse Fourier transform on the third spectrum graph to convert the third spectrum graph to a third digital image, the third digital image including the data lines of the first digital image, wherein at least some of the grid lines of the first digital image are removed from the third digital image.

18. The non-transitory computer-readable storage medium of claim 17, wherein said creating the filter comprises determining frequencies of the data, wherein the data of the plural pixels of the first subset have frequencies less than a determined threshold value, and the data of the plural pixels of the second subset have frequencies greater than the determined threshold value.

19. The non-transitory computer-readable storage medium of claim 17, wherein said removing the one or more of the plural pixels from the first digital image to create a second digital image comprises removing a predetermined portion of the data lines from the first digital image.

20. The non-transitory computer-readable storage medium of claim 17, wherein said applying the filter to the first spectrum graph comprises multiplying each element of the first spectrum graph by the corresponding element of the filter to create the third spectrum graph.

\* \* \* \* \*